United States Patent Office 2,716,430
Patented Aug. 30, 1955

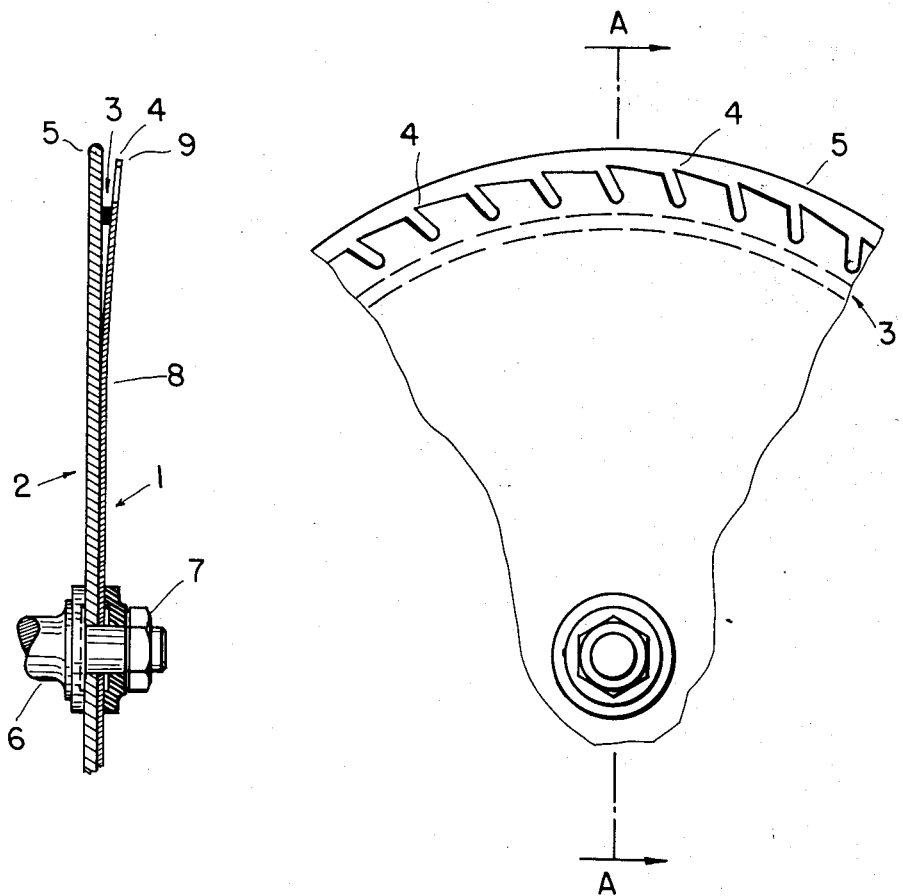

2,716,430
DISK JOINTER PLANER

Francis A. Pall, San Diego, Calif., assignor of one-half to Isabelle Marion Pall, San Diego, Calif.

Application November 3, 1954, Serial No. 466,526

1 Claim. (Cl. 144—218)

This invention relates generally to surfacer machines for non-metallic material, more particularly where small workpieces have to be surfaced.

In the small woodworking shops, and chiefly in the ever growing home workshops, where the space limitations, economy or other factors do not permit the procurement of a jointer-planer to finish the surfaces of the sawed workpieces, difficulties are always present because hand surfacing, a lengthy and difficult process, is seldom satisfactory.

The heretofore proposed surfacing machine, or as commercially named, "jointer planer," has two or more individual cutter knives, secured in alignment in an arbor, and rotating between two tables. The workpiece is moved by hand from one table against the rotating knives, then slid on the other table. In this operation the slightest carelessness or slippage, could result in irreparable damage to the fingers of the operator. These machines are the most perilous implements ever devised, especially where relatively small objects are to be surfaced, as in the home workshops, and where amateur hands are operating these hazardous machines. Furthermore a sizable investment is necessary to procure even the smallest of these jointer planers.

The applicant offers a solution to the problems and objections heretofore encountered.

It is the object of my invention, first: to provide a surfacing machine which reduces the danger of being injured to a negligible minimum; second: to provide an apparatus which is capable of surfacing the smallest workpiece anyone can handle; third: to provide a surfacing apparatus which fits to anyone's budget; fourth: to provide a new type of surfacing, which for economic reasons, could be operated on the arbor of a table saw or other suitable equipment, thereby making it possible to include a jointer-planer in the list of the increasingly popular combination of power tools.

These and other objects will be evident from the following detailed description, in which an illustrative form of the apparatus is disclosed in detail.

The objects of this invention may be realized in its characteristic disk shaped cutter head, having a toothed periphery with transverse cutting edges. The other part of this apparatus is the support-guard, a somewhat larger diameter and heavier gage disk, having a smooth periphery. The third part is a somewhat lesser diameter washer shaped spacer, preferably attached to the support guard.

Still another feature and advantage of this invention is, that when the cutter head becomes dull, it is a very simple matter to re-sharpen it either by hand, or with a saw sharpener, but the quickest and best results can be obtained with my "Self Jointing Integral Saw Sharpener" as described in my co-pending application, filed June 15, 1953, Ser. No. 361,648.

One form of my invention is illustrated in the accompanying drawing, where Fig. 1 is a partial side elevation and Fig. 2 is the section through line A—A in Fig. 1.

Referring to the figures, it will be seen, that this apparatus consists of three members; one is the cutter head 1; the other is the support-guard 2; and the third is the spacer 3. The disk shaped cutter head 1 has a toothed periphery, with transverse cutting edges 4. The other member of this apparatus is the support guard 2, which is somewhat larger in diameter, and a heavier gage disk, having a smooth periphery 5. The third member of this invention is the washer shaped spacer 3.

For economic and other reasons, this jointer-planer may be mounted and operated on the arbor of the table saw, but it does not relate to its mechanical details, therefore no description need be given of the table saw. It being understood that many other existing and known equipments may be employed to support and rotate this apparatus. It is also understood that numerous other profiles, than those illustrated, could be used for the teeth of the cutter head, as for example my circular saw, filed July 24, 1952, now Patent No. 2,648,360.

The apparatus is assembled on the arbor 6 of a table saw (not shown), the spacer washer 3, concentric with the arbor, is mounted between the cutter head 1, and the support-guard 2. When the nut 7 is tightened, the center portion 8 of the cutter head 1 will be drawn toward the center of the heavier gage support-guard 2, thereby changing the flat ground side-surface of the cutter head 1 into a concave shape; consequently the outboard tips 9 of the cutting edges 4 will be located to the farthest point from the plane of the support-guard 2, and will remain in perfect alignment as when ground flat. For this reason there is no need to bend the teeth as is a standard practice to do so for clearance on flat ground similar equipments. It is noted here however, that two or more teeth (not shown) are bent toward the support guard 2, for the purpose of cleaning the chips from between the cutter head 1 and said support-guard 2. The inboard side of the periphery of the cutter head 1, will lean heavily on the spacer 3, thereby increasing the rigidity of the unit, consequently casting out the vibration and bending of the cutter head while cutting.

In operation the unit is mounted on the arbor of a table saw and the workpiece is surfaced in a similar manner as in the cut off or ripping operation with the table saw, using the miter gage or the fence as a guide; here however, instead of cutting a part off, only the surface will be removed. Due to the difference in the relative position of the tips 9 and the concave center portion 8, only said tips will touch the work surface, thereby preventing any friction, and as a result the power consumption is very low and the produced surfaces on all non-metallic materials are unsurpassed by any of the heretofore proposed methods achieved.

While I have shown and described certain specific embodiments of my invention, it will be understood that numerous changes may be made therein, partly as hereinbefore indicated and partly as will be obvious to those skilled in the art, therefore I do not wish to be understood as limiting myself to the precise form of the invention as disclosed, but intend to claim it as broadly as may be permitted by the state of the prior art and the scope of the appended claim.

What applicant claims as his invention:

As a new article of manufacture, an apparatus for surfacing non metallic materials, comprising the combination of a disk shaped cutter head having a toothed periphery and transverse cutting edges, with a support-guard disk of somewhat larger diameter and heavier gage than the cutter head, said cutter head and support-guard disk being in face to face and in partially spaced relation and separated at their peripheries by a somewhat lesser diameter annular spacer, means for drawing the center of the cutter head against the support-guard disk, thus forming a concave outer side surface on said cutter head, said combination to be mounted and operated on a rotating arbor.

References Cited in the file of this patent
UNITED STATES PATENTS

| | | |
|---|---|---|
| 2,592,382 | Blais | Apr. 8, 1952 |
| 2,659,398 | Marvin | Nov. 17, 1953 |